United States Patent
Firth

(10) Patent No.: US 8,687,279 B2
(45) Date of Patent: Apr. 1, 2014

(54) LENS

(75) Inventor: Paul Firth, Nr Totnes (GB)

(73) Assignee: Oclaro Technology Limited, Northhamptonshire (GB)

( * ) Notice: Subject to any disclaimer, the term of this patent is extended or adjusted under 35 U.S.C. 154(b) by 0 days.

(21) Appl. No.: 13/546,964

(22) Filed: Jul. 11, 2012

(65) Prior Publication Data

US 2013/0016437 A1 Jan. 17, 2013

(30) Foreign Application Priority Data

Jul. 12, 2011 (GB) .................. 1111897.3

(51) Int. Cl.
*G02B 3/00* (2006.01)

(52) U.S. Cl.
CPC .......... *G02B 3/00* (2013.01); *G02B 2003/0093* (2013.01)
USPC .......................................... 359/642; 359/720

(58) Field of Classification Search
CPC ................. G02B 3/00; G02B 2003/00; G02B 2003/0093
USPC ........................ 359/642, 720, 811; D16/134
See application file for complete search history.

(56) References Cited

U.S. PATENT DOCUMENTS

| 5,557,106 | A | 9/1996 | Ioco |
| 2007/0171535 | A1 | 7/2007 | Shyu et al. |
| 2008/0018992 | A1 | 1/2008 | Eva |
| 2009/0261250 | A1* | 10/2009 | Zhou et al. ............ 250/307 |
| 2010/0033849 | A1 | 2/2010 | Seki et al. |

FOREIGN PATENT DOCUMENTS

| EP | 2 315 068 A1 | 4/2011 |
| JP | 2005202082 | 7/2005 |

OTHER PUBLICATIONS

European Application No. 12174996.4-2217 Search Report (Nov. 7, 2012).
GB search report for applicaton No. GB1111897.3 dated Nov. 8, 2011.

* cited by examiner

*Primary Examiner* — Darryl J Collins
(74) *Attorney, Agent, or Firm* — Fenwick & West LLP

(57) ABSTRACT

The invention relates to a lens comprising two or more seating surfaces and an optical axis offset from the center of the lens such that the optical axis is spaced by a first distance from a first seating surface and by a second distance from a second seating surface. The first and second distances are different so that the lens can be orientated to provide at least two different optical axis heights depending upon which seating surface is chosen to seat the lens.

14 Claims, 1 Drawing Sheet

LENS

CROSS-REFERENCE TO RELATED APPLICATIONS

This application claims benefit of United Kingdom patent application number 1111897.3, filed Jul. 12, 2011, which is herein incorporated by reference.

BACKGROUND OF THE INVENTION

1. Field of the Invention

The present invention relates to a lens.

2. Description of the Related Art

Lenses are used in many different optical devices in order to focus or collimate light. In particular applications the components employed in such optical devices are small and have dimensional tolerances that lead to device-by-device variations in the heights of the components above a reference plane, thereby leading to optical alignment problems.

For example, in an optical modulator the height of the components may vary above the base of the device or above a silicon wafer substrate or temperature controller. The final component to be positioned and glued into place in such devices is usually a collimating lens which needs to be aligned with a 0.2 to 0.3 μm tolerance. Whilst it is, in principle, possible to adjust the height of the lens by varying the glue thickness, doing so would introduce undesirable temperature dependence since the glue will typically have a higher coefficient of thermal expansion (CTE) than the other components in the device. Accordingly, it is common to use a standard glue thickness of 15 to 20 microns and to select a lens with an appropriate optical axis height to achieve the best optical alignment.

The lenses employed in such applications are generally in the shape of a spherical ball which has been squashed inwardly to create centrally disposed concave cavities on opposite side faces, such that the optical axis passes through the centres of the cavities. A bottom surface of the lens is then ground to form a planar base at a particular distance from the optical axis. In practice, a number of different bins of lenses are provided, with each bin including lenses ground to a particular height. Thus, during manufacture of the optical device, a lens is chosen from the bin providing the closest height to that desired for good optical alignment. This method therefore requires a large inventory of lenses which have been ground to particular heights in case they are required.

It is therefore an object of the present invention to provide a lens which addresses at least some of the above-aforementioned problems.

SUMMARY OF THE INVENTION

According to a first aspect of the present invention there is provided a lens comprising two or more seating surfaces and an optical axis offset from the centre of the lens such that the optical axis is spaced by a first distance from a first seating surface and by a second distance from a second seating surface, and wherein the first and second distances are different so that the lens can be orientated to provide at least two different optical axis heights depending upon which seating surface is chosen to seat the lens.

Embodiments of the present invention therefore provide a single lens which can be selectively orientated to provide an optical axis at two or more different heights. Accordingly, the lens negates the need to have separate bins stocked with lenses configured for individual optical heights. The lens of the present invention may therefore be considered a 'multi-bin' lens.

The lens may be used in selected orientations to compensate for differences in glue thickness and/or the height of an optical path in an optical device.

Each seating surface may be substantially planar and the optical axis may be parallel to the plane of each seating surface.

In a particular embodiment, four seating surfaces are provided and the optical axis is offset such that each seating surface provides a different optical axis height. Accordingly, one lens (and one bin) may be used to provide four different optical height requirements.

The lens may be substantially cuboidal and may have a substantially square front face and a substantially square rear face with the optical axis passing through the front and rear faces.

An indicator may be provided to facilitate identification of the lens orientation and therefore the optical axis height selected. The indicator may comprise a cut-out and may be located at a corner of the lens.

The lens may be a collimating lens and/or an aspheric lens.

According to a second aspect of the present invention there is provided an optical device comprising a lens according to the first aspect of the invention.

The optical device may be constituted by a modulator or demodulator. The optical device may comprise an interferometer (e.g. a Mach-Zender interferometer).

According to a third aspect of the present invention there is provided an optical system comprising a lens according to the first aspect of the invention.

According to a fourth aspect of the present invention there is provided a method of manufacturing a lens comprising moulding a lens having two or more seating surfaces and an optical axis offset from the centre of the lens such that the optical axis is spaced by a first distance from a first seating surface and by a second distance from a second seating surface, and wherein the first and second distances are different so that the lens can be orientated to provide at least two different optical axis heights depending upon which seating surface is chosen to seat the lens.

By moulding the lens to include the different optical heights, traditional grinding of each individual lens is eliminated.

According to a fifth aspect of the present invention there is provided a method of manufacturing an optical device comprising selecting a desired seating surface of a lens according to the first aspect of the invention; orientating the lens so as to seat the lens on the desired seating surface; and fixing the lens in the optical device so that the optical axis of the lens is at the selected height.

The sixth aspect of the present invention relates to the use of a lens according to the first aspect of the invention to compensate for variations in glue thickness and/or the height of an optical path.

BRIEF DESCRIPTION OF THE DRAWINGS

Embodiments of the invention will now be described, by way of example only, with reference to the accompanying figures, in which.

DETAILED DESCRIPTION

Figure 1:
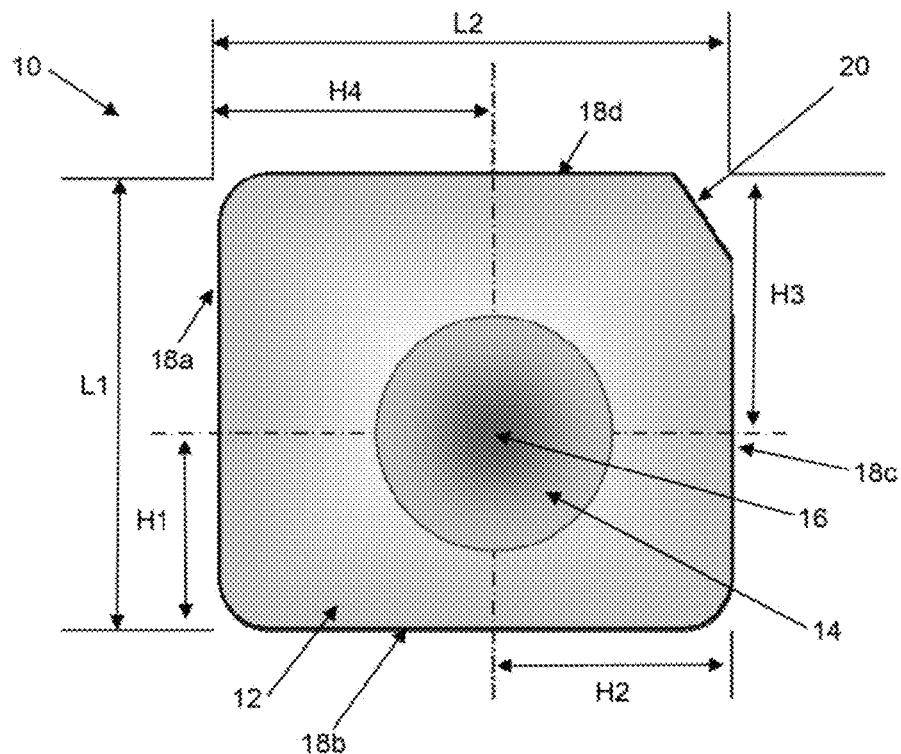
FIG. 1 shows a front view of a lens according to an embodiment of the present invention.

FIG. 1 illustrates a lens 10 according to an embodiment of the present invention. The lens 10 is substantially cuboidal and has a substantially square front face 12 and a substantially square rear face (not shown). In the embodiment illustrated, the lens 10 has a height L1 of 0.93 cm and a length L2 of 0.95 cm. Opposed concave cavities 14 are provided in each of the front and rear faces 12 such that an optical axis 16 of the lens 10 passes through the centres of the cavities 14.

Each of the four (top, bottom, left and right) sides of the lens 10 are configured as planar seating surfaces 18a, 18b, 18c, 18d. As shown in FIG. 1, the optical axis 16 is offset from the centre of the lens 10 such that each seating surface 18a, 18b, 18c, 18d provides a different optical axis height H1 (0.455 cm), H2 (0.465 cm), H3 (0.475 cm), H4 (0.485 cm). Accordingly, the lens 10 can be sat on any one of the seating surfaces 18a, 18b, 18c, 18d in order to locate the optical axis 16 at one of four different heights.

As shown in FIG. 1, the top right corner 20 of the lens 10 comprises a 45° angled chamfer (i.e. cut-out) which serves as an indicator so that operators can easily identify the orientation of the lens 10 in order to select a desired one of the four seating surfaces 18a, 18b, 18c, 18d.

Figure 2:
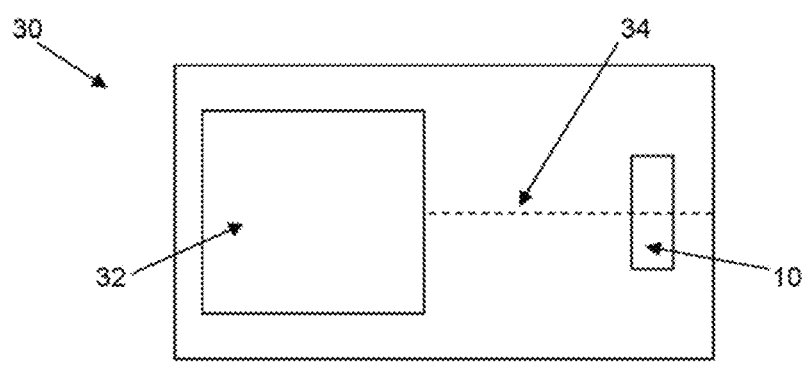
FIG. 2 shows a plan view of an optical device according to an embodiment of the present invention.

The lens 10 may be employed as a collimator in an optical device such as a modulator 30, as shown in FIG. 2. The modulator 30 comprises a modulator chip 32 from which emerges a diverging beam of light 34. The lens 10 is therefore orientated and glued into the modulator 30 package on a selected one of its seating surfaces 18a, 18b, 18c, 18d such that the optical axis of the beam of light 34 passes through the optical axis 16 of the lens 10 in order for the light 34 to be suitably collimated.

It will be appreciated by persons skilled in the art that various modifications may be made to the above embodiment without departing from the scope of the present invention.

The invention claimed is:

1. A lens configured to provide choice of a height of an optical axis thereof above a surface on which said lens is seated for alignment of said optical axis with light passing through the lens at a predetermined height above said surface, the lens comprising two or more seating surfaces, each in a plane parallel to the optical axis, the optical axis being offset from a centre of the lens such that it is spaced by a first distance from a first seating surface and by a second distance from a second seating surface, and wherein the first and second distances are different so that the lens can be orientated to choose one from at least two different optical axis heights depending upon which seating surface is chosen to seat the lens.

2. The lens according to claim 1 wherein each seating surface is substantially planar.

3. The lens according to claim 1 wherein four seating surfaces are provided and the optical axis is offset such that each seating surface provides a different optical axis height.

4. The lens according to claim 1 wherein the lens is substantially cuboidal and has a substantially square front face and a substantially square rear face with the optical axis passing through the front and rear faces.

5. The lens according to claim 1 wherein an indicator is provided to facilitate identification of the lens orientation and thereby the optical axis height selected.

6. The lens according to claim 5 wherein the indicator comprises a cut-out located at a corner of the lens.

7. The lens according to claim 1 configured as a collimating lens and/or an aspheric lens.

8. An optical device comprising a lens according to claim 1.

9. The optical device according to claim 8 wherein the device is constituted by a modulator or demodulator.

10. The optical device according to claim 8 wherein the device comprises an interferometer.

11. An optical system comprising a lens according to claim 1.

12. A method of manufacturing an optical device comprising selecting a desired seating surface of a lens according to claim 1; orientating the lens so as to seat the lens on the desired seating surface; and fixing the lens in the optical device so that the optical axis of the lens is at the selected height.

13. Use of a lens according to claim 1 to compensate for variations in glue thickness and/or the height of an optical path.

14. A method of manufacturing a lens configured to provide choice of a height of an optical axis thereof above a surface on which said lens is seated for alignment of said optical axis with light passing through the lens at a predetermined height above said surface, comprising moulding a lens having two or more seating surfaces, each in a plane parallel to the optical axis, the optical axis being offset from a centre of the lens such that it is spaced by a first distance from a first seating surface and by a second distance from a second seating surface, and wherein the first and second distances are different so that the lens can be orientated to choose one from at least two different optical axis heights depending upon which seating surface is chosen to seat the lens.

* * * * *